UNITED STATES PATENT OFFICE.

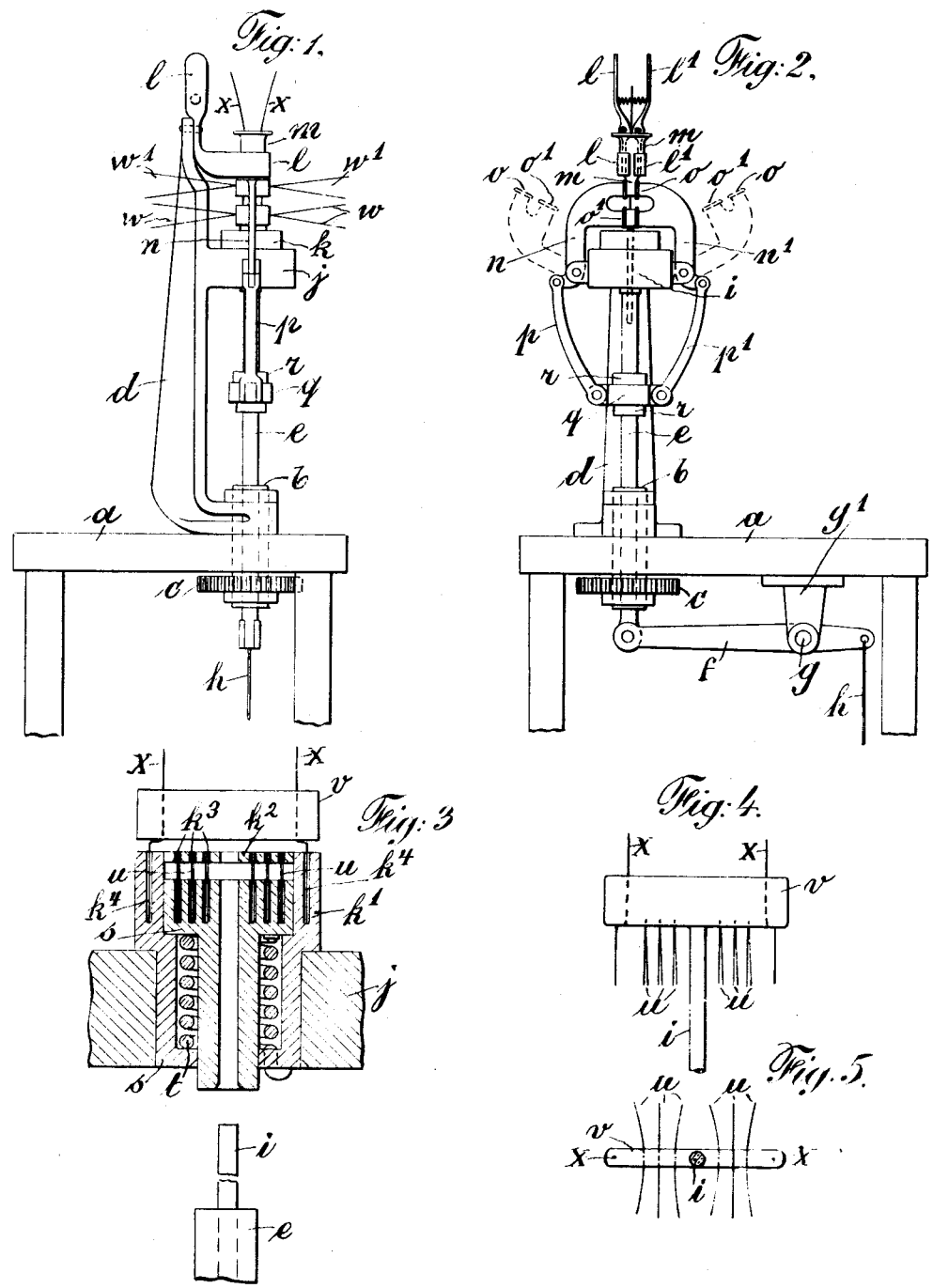

KARL FARKAS, OF GLEN RIDGE, NEW JERSEY.

AUTOMATIC FUSION DEVICE FOR MAKING METALLIC-FILAMENT SUPPORTS.

1,104,295.   Specification of Letters Patent.   Patented July 21, 1914.

Application filed December 19, 1910. Serial No. 598,101.

*To all whom it may concern:*

Be it known that I, KARL FARKAS, a citizen of the Kingdom of Hungary, and a resident of Glen Ridge, county of Essex, and State of New Jersey, have invented certain new and useful Improvements in Automatic Fusion Devices for Making Metallic-Filament Supports, of which the following is a specification.

This invention has reference to an automatic fusion device for making metallic filament supports.

It is the special object of this invention to produce an automatic apparatus by means of which, with but one operation the lead wires are sealed into the top portion of the stem, the filament end supports and leads simultaneously to a separate glass rim located above the stem and the glass rod or arbor fused to said separate glass rim. Accordingly two sets of fusing flames are required which are arranged parallel to each other. In this manner but one operation is required with the aid of the novel apparatus in place of a number of operations because heretofore the leads were sealed into the stem by one operation, the glass rod or arbor fused to the stem by a second operation and each single filament end support sealed to a rim of the arbor by a separate operation.

It is evident that a great saving in time and wages is effected by means of this apparatus which, as above noted, fuses the stem to a separate rim of glass and leaves the leads free between said rim and the top end portion of the stem whereby an elastic device for the filament supports and filaments is produced for the purpose of reducing the percentage of breakage of the fragile metallic filaments. The device is continuously rotated and when the flames have fused simultaneously the two glass portions above referred to the various wires and the glass rod or arbor are moved by a foot operated device and the wires are sealed into the fused glass portions and the arbor fused centrally to the separate glass portion above referred to, all as will be fully described hereinafter with reference to the accompanying drawing in which:

Figure 1 represents in side elevation an automatic fusion device for making metallic filament supports embodying in desirable form the present improvements. Fig. 2 is a front elevation of Fig. 1. Fig. 3 illustrates on an enlarged scale in section a chuck or magazine for the wires with a shaft that contains the glass rod or arbor. Fig. 4 shows in side elevation on an enlarged scale the separate glass rim after the wires have been sealed in, and the rod or arbor fused thereto, and Fig. 5 is a bottom plan view of Fig. 4.

Similar characters of reference denote like parts in all the figures.

The automatic fusion device for making metallic filament supports is substantially mounted on a table $a$ through which passes a sleeve $b$. The sleeve $b$ carries a gear wheel $c$ which is driven by any convenient mechanism and source of power. Secured to the other end of the sleeve $b$ is a support or arm $d$ shown in Figs. 1 and 2 to rise vertically up. The support $d$ turns with the sleeve $b$ when the latter is rotated by the gear $c$. A shaft $e$ passes through the sleeve $b$ to the lower end of which is pivoted a lever $f$ the fulcrum of which is at $g$ on a support $g^1$ secured to the lower portion of the table $a$. The other end of the lever $f$ is connected by a rod $h$ to a foot treadle not shown and operated thereby. The upper end of the shaft $e$ is hollowed out to receive the glass rod or arbor $i$.

The support or arm $d$ has a circular part $j$ at a right angle thereto with a circular opening the center of which corresponds with the center of the shaft $e$. Mounted in this opening is a chuck and magazine for housing the wires $u$ the detail construction of which is shown in Fig. 3 and will be described farther down. A double clamp $l, l^1$ is pivotally secured to the upper end of the support or arm $d$. This clamp holds the hollow glass stem $m$. Arms $n, n^1$ are pivoted to the circular part $j$. These are shown in dotted lines in Fig. 2 in the open position and in full lines in the operative position when pressing the glass. Each of the upper parts of the arms $n, n^1$ has two rectangular plates $o, o^1$, which serve to press the heated glass together and are the parts that come in contact therewith. The lower and shorter ends of the arms $n, n^1$ are connected by two links $p, p$ to a ring $q$. This ring is mounted on the shaft $e$ and held in place by two collars $r$.

The detail construction of the chuck and magazine $k$ is shown on an enlarged scale in Fig. 3 in vertical central section. The chuck body $k^1$ is reduced below and the reduced portion is mounted within the circular part $j$ of the support or arm $d$. The chuck body $k^1$ carries inside a correspondingly formed wire holder or wire magazine $s$ which is centrally hollowed out for the purpose of housing the glass rod or arbor $i$. A coiled spring $t$ serves to hold the main body of the chuck and the magazine in the position shown in Fig. 3. The magazine part $s$ does not extend normally to the top end of the main chuck body $k^1$ whose upper end carries a plate $k^2$ which has a multiple of openings $k^3$ corresponding with a like multiple of openings in the upper part of the magazine $s$. These openings $k^3$ and $s^1$ are to receive bent wires $u$ so arranged that the bent portion is normally flush with the upper surface of the plate $k^2$. In Fig. 3 six such bent wires $u$ are shown for a like number of metallic filament loops. However any other multiple of wires may be placed therein or more openings may be provided. The body portion $k^1$ of the chuck has two vertical openings $k^4$ to receive the leads which are much longer than the other wires located in the magazine and serve later on as supports for the ends of the filament loops.

The operation of the device is substantially as follows: When bent wires for the supports of the filament ends are in the magazine openings and leads in the openings of the chuck body then the stem $m$ is placed in the clamps $l$, $l^1$ with a short separate glass tube $v$ resting on the bent portions of the leads $x$. Of course the glass rod or arbor $i$ has also been placed by this time in the hollow shaft $e$. Upon rotation of the device one set of gas flames $w$ fuses the rotating glass tube $v$ and the other set of gas flames $w^1$ fuses the inner end portion of the stem $m$. When both glass portions have been sufficiently fused by the flames $w$, $w^1$, the foot treadle is operated whereby the lever $f$ pushes the shaft $e$ carrying the glass rod $i$ in an upward direction against the magazine $s$ and the rod $i$ passes through same. The top surface of the shaft $e$ at a certain moment presses against the lower portion of the magazine $s$ whereby same is raised. This operation brings the wires $u$ beyond the openings $k^3$ of the plate $k^2$ until the wires $u$ strike the heated glass portion $v$. The plates $o$, $o^1$ of the arms $n$, $n^1$ then press the glass and thereby seal all the wires. At the same time the glass rod $i$ is centrally fused to the separate glass portion $v$ together with those lead portions that are within same. Thus the leads $x$ are fused simultaneously into the stem and its upper portions into the separate glass portion $v$ together with the glass rod and filament end supports. As shown all this is done in one operation whereby a great deal of time is saved. Upon releasing the foot from the treadle the spring $t$ forces the chuck and magazine back into its normal position and the finished support is taken out

I claim as my invention:

1. In an automatic fusion device for making metallic filament supports, a chuck and magazine comprising a chuck body having two openings for the leads, a magazine of less height than the chuck with central channel therein having a reduced lower portion and a plurality of openings in its top portion for receiving bent wires, a coiled spring around the reduced portion of the magazine, a top plate on the chuck body having openings coinciding with the openings in the magazine, a hollowed out shaft adapted to receive the glass rod or arbor in line with the central channel of the magazine, and means for advancing the glass rod or arbor and pushing the magazine toward the top plate of the chuck body to bring forward the wires.

2. In an automatic fusion device for making metallic filament supports, a chuck and magazine comprising a chuck body with two openings for the leads, a magazine of less height than the chuck with central channel having a reduced lower portion and a plurality of openings in its top portion for receiving bent wires to form the filament end supports, a top plate on the chuck body with openings coinciding with the openings in the magazine, means for supporting the stem, means for supporting and advancing the arbor, means for pushing the magazine toward the top plate of the chuck body to bring forward the wires, and a coiled spring around the reduced portion of the magazine tending to force the chuck and magazine into its normal position.

Signed at New York, N. Y., this 17th day of December, 1910.

KARL FARKAS.

Witnesses:
  CORINNE MYERS,
  VERA PAULSEN.